United States Patent
Yang et al.

(10) Patent No.: US 7,720,158 B2
(45) Date of Patent: May 18, 2010

(54) MEMORY MANAGING METHOD AND VIDEO DATA DECODING METHOD

(75) Inventors: Ying-Chih Yang, Hsinchu (TW); Han-Liang Chou, Kaohsiung (TW); Jen-Yi Liao, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 1442 days.

(21) Appl. No.: 10/907,562

(22) Filed: Apr. 6, 2005

(65) Prior Publication Data

US 2006/0083313 A1    Apr. 20, 2006

(30) Foreign Application Priority Data

Oct. 20, 2004    (TW) .............................. 93131760 A

(51) Int. Cl.
*H04N 7/12* (2006.01)
*H04N 11/02* (2006.01)

(52) U.S. Cl. .............................. 375/240.25; 375/240.12

(58) Field of Classification Search ............ 375/240.23, 375/240.25, 240.24, 240.12; 345/535, 536, 345/537, 538, 539, 521, 512, 515, 516, 508, 345/511, 518
See application file for complete search history.

(56) References Cited

U.S. PATENT DOCUMENTS

| | | | | |
|---|---|---|---|---|
| 5,561,465 A | * | 10/1996 | Fautier et al. | 375/240.12 |
| 5,974,521 A | * | 10/1999 | Akerib | 712/11 |
| 6,057,862 A | * | 5/2000 | Margulis | 345/535 |
| 6,460,127 B1 | * | 10/2002 | Akerib | 712/10 |

* cited by examiner

*Primary Examiner*—Behrooz Senfi
(74) *Attorney, Agent, or Firm*—Jianq Chyun IP Office

(57) ABSTRACT

A memory managing method for video data decoding process is provided. The memory managing method includes the following steps. A first frame having a first definition is stored, wherein the first frame is a first type or a second type. A second frame having the first definition is stored, wherein the second frame is the first type or the second type. A first frame having a second definition is stored in the memory space where the first frame having the first definition was originally stored, and the remaining memory space left after the original first frame having the first definition had been stored is released, wherein the memory space for storing the first frame having the first definition is greater than the memory space for storing the first frame having the second definition. A third frame having the second definition is stored, wherein the third frame is a third type.

19 Claims, 8 Drawing Sheets

MEMORY MANAGING METHOD AND VIDEO DATA DECODING METHOD

CROSS-REFERENCE TO RELATED APPLICATION

This application claims the priority benefit of Taiwan application serial no. 93131760, filed on Oct. 20, 2004.

BACKGROUND OF THE INVENTION

1. Field of the Invention

The present invention relates to a decoding method and a memory managing method, and more particularly, to a video data decoding method and a memory managing method for video data decoding process.

2. Description of the Related Art

Generally speaking, the amount of the video data is usually enormous. In order to save the space for storing the video data, and to save the transmission bandwidth for transmitting the video data, the video data have to be compressed before it is transmitted. The object of the data compression is achieved by removing the superfluous information from the video data. For example, if a subsequent frame is similar to the previous frame, the previous frame is preserved and the same content in the subsequent frames are removed (that is, only the information with different content is preserved), such that the amount of the digital video data is significantly reduced.

For the MPEG (Motion Picture Experts Group) standard, the video decoding process usually produces three types of frames, which are intra-coding frame (I frame), prediction frame (P frame), and Bi-directional frame (B frame). It should be noted that P frame is decoded with reference to information of I frame stored in the memory. In addition, B frame is decoded with reference to information of both I frame and P frame stored in the memory.

When the High Definition Television (HDTV) or Digital Video Disc (DVD) data are being decoded, the memory size for storing I frame, P frame, and B frame are increased according to the big size of the video data. For example, in the specification defined by the Advanced Television Systems Committee (ATSC), the memory size and bandwidth for 1920×1080 interleaved displaying is about 6 times the memory size of the specification defined by the National Television System Committee (NTSC).

In a system having a limited memory size, if the data amount of the reference frame is directly reduced without considering other factors, the quality of the frame decoded based on the reference frame would deteriorate, which causes significant degradation of the group of picture quality. In addition, in order to avoid the significant degradation of the group of picture quality, the memory size has to be increased, which inevitably increases the manufacturing cost.

SUMMARY OF THE INVENTION

Therefore, it is an object of the present invention to provide a memory managing method for storing video frame with higher definition in a limited memory space.

In addition, it is another object of the present invention to provide a video data decoding method for decoding video frame with higher definition in a limited memory space.

In addition, it is yet another object of the present invention to provide a video data decoding method for decoding video frame with different definition according to the different size of the memory.

In order to achieve objects mentioned above and others, the present invention provides a memory managing method for video decoding process. The memory managing method comprises the following steps. In step A, a first frame having a first definition is stored in an unused memory space of a memory, wherein the first frame is either a first type or a second type. In step B, a second frame having the first definition is stored in the unused memory space of the memory, wherein the second frame is either the first type or the second type. In step C, a first frame having a second definition is stored in the memory space where the first frame having the first definition was originally stored, and the remaining memory space left after the original first frame having the first definition had been stored is then released, wherein the memory size for storing the first frame having the first definition is greater than the memory size for storing the first frame having the second definition. In step D, a third frame having a second definition is stored in the unused memory space of the memory, wherein the third frame is a third type.

In accordance with an embodiment of the present invention, the step C comprises the following steps: obtaining a macroblock data of the first frame having the second definition; releasing the memory space where the corresponding macroblock data of the first frame having the first definition was originally stored; and storing the macroblock data of the first frame having the second definition in the unused memory space of the memory.

In accordance with an embodiment of the present invention, when obtaining the second frame, before the step B is performed, if any type of frame having the second definition has been stored in the memory, the memory space for storing any type of frame having the second definition in the memory is released.

In accordance with an embodiment of the present invention, when obtaining the third frame, before the step D is performed, if the third type of frame having the second definition has been stored in the memory, the memory space for storing the frame in the memory is released.

In accordance with an embodiment of the present invention, the memory managing method further comprises a step of arranging the unused memory space of the memory.

In accordance with an embodiment of the present invention, the first type of frame is I frame, the second type of frame is P frame, and the third type of frame is B frame.

In accordance with an embodiment of the present invention, the first definition is satisfied with the ATSC specification, and the second definition is satisfied with the NTSC specification.

In accordance with an embodiment of the present invention, the memory size is greater than or equal to two times of the memory size for storing the frame having the first definition.

In order to achieve objects mentioned above and others, the present invention provides a memory managing method for video decoding process. The memory managing method comprises the following steps. In step A, a first frame having a first definition is stored in an unused memory space of a memory, wherein the first frame is either a first type or a second type. In step B, the Xth row data of a second frame having the first definition is sequentially stored in an unused memory space of a memory, wherein the second frame is either the first type or the second type. In step C, the Yth row data of the first frame having the second definition is sequentially stored in the unused memory space of the memory, wherein the memory size for storing the first definition is greater than the memory size for storing the second definition. In step D, the memory space where the Yth row data of the first frame having the first definition was originally stored is sequentially released, wherein (X−Y) is greater than or equal to a predetermined tolerance value. In step E, a third frame having the second definition is stored in the unused memory space of the memory, wherein the third frame is a third type.

In accordance with an embodiment of the present invention, the predetermined tolerance value is a vertical component of a motion vector. In addition, the vertical component of the motion vector is satisfied with the MPEG-2 specification.

In accordance with an embodiment of the present invention, when obtaining the second frame, before the step B is performed, if any type of frame having the second definition has been stored in the memory, the memory space for storing any type of frame having the second definition in the memory is released.

In accordance with an embodiment of the present invention, when obtaining the third frame, before the step E is performed, if the third type of frame having the second definition has been stored in the memory, the memory space for storing the frame in the memory is released.

In accordance with an embodiment of the present invention, the memory managing method further comprises a step of arranging the unused memory space of the memory.

In accordance with an embodiment of the present invention, the first type of frame is I frame, the second type of frame is P frame, and the third type of frame is B frame.

In accordance with an embodiment of the present invention, the first definition is satisfied with the ATSC specification, and the second definition is satisfied with the NTSC specification.

In accordance with an embodiment of the present invention, the memory size is less than two times of the frame having the first definition, and is greater than a sum of one time of the frame having the first definition and one time of the frame having the second definition.

In order to achieve objects mentioned above and others, the present invention provides a video data decoding method. The video data decoding method comprises the following steps. First, a memory is provided. In step A, a first frame having a first definition is decoded, wherein the first frame is either a first type or a second type, and the first frame having the first definition is stored in an unused memory space of the memory. In step B, the video data is decoded with reference to the first frame having the first definition, so as to obtain a second frame having the first definition, wherein the second frame is the second type, and the second frame having the first definition is stored in the unused memory space of the memory.

In step C, the first frame having the first definition is changed to a first frame having the second definition which is then stored in the unused memory space of the memory, wherein the memory size for storing the first definition is greater than the memory size for storing the second definition, and the memory space where the first frame having the first definition was originally stored is released. In step D, the video data is decoded with reference to both the first frame having the second definition and the second frame having the first definition, so as to obtain a third frame having the second definition, wherein the third frame is the third type, and the third frame having the second definition is stored in the unused memory space of the memory.

In accordance with an embodiment of the present invention, the step C comprises: sequentially converting a macroblock data of the first frame having the second definition; releasing the memory space where the corresponding macroblock data of the first frame having the first definition was originally stored; and sequentially storing the macroblock data of first frame having the second definition in the unused memory space of the memory.

In accordance with an embodiment of the present invention, the method for changing the first frame having the first definition to the first frame having the second definition comprises either compressing or shrinking it.

In accordance with an embodiment of the present invention, the first type of frame is I frame, the second type of frame is P frame, and the third type of frame is B frame.

In accordance with an embodiment of the present invention, the first definition is satisfied with the ATSC specification, and the second definition is satisfied with the NTSC specification.

In accordance with an embodiment of the present invention, the memory size is greater than or equal to two times of the memory size for storing the frame having the first definition.

In order to achieve objects mentioned above and others, the present invention provides a video data decoding method. The video data decoding method comprises the following steps. First, a memory is provided. In step A, a first frame having a first definition is decoded, wherein the first frame is either a first type or a second type, and the first frame having the first definition is stored in an unused memory space of a memory. In step B, the video data is decoded with reference to the first frame having the first definition, so as to sequentially obtain the Xth row data of a second frame having the first definition, wherein the second frame is the second type, and the Xth row data of the second frame having the first definition is sequentially stored in the unused memory space of the memory.

In step C, the Yth row data of the first frame having the first definition is sequentially changed to the Yth row data of a first frame having the second definition, which is then sequentially stored in the unused memory space of the memory. In step D, the memory space where the Yth row data of a first frame having the first definition was originally stored is sequentially released, wherein (X−Y) is greater than or equal to a predetermined tolerance value. In step E, the video data are decoded with reference to both the first frame having the second definition and the second frame having the first definition, so as to obtain a third frame having the second definition, wherein the third frame is the third type, and the third frame having the second definition is stored in the unused memory space of the memory.

In accordance with an embodiment of the present invention, the predetermined tolerance value is a vertical component of a motion vector. In addition, the vertical component of the motion vector is satisfied with the MPEG-2 specification.

In accordance with an embodiment of the present invention, the method for changing the Yth row data of the first frame having the first definition to the Yth row data of the first frame having the second definition comprises either compressing or shrinking it.

In accordance with an embodiment of the present invention, the first type of frame is I frame, the second type of frame is P frame, and the third type of frame is B frame.

In accordance with an embodiment of the present invention, the first definition is satisfied with the ATSC specification, and the second definition is satisfied with the NTSC specification.

In accordance with an embodiment of the present invention, the memory size is less than two times of the frame having the first definition, and is greater than a sum of one time of the frame having the first definition and one time of the frame having the second definition.

In order to achieve objects mentioned above and others, the present invention provides a video data decoding method. The video data decoding method comprises the following steps. First, a decoding module and a memory are provided, wherein the decoding module is suitable for providing a first mode, a second mode, a third mode, or a fourth mode of video data, and the decoding module outputs either a first type or a second type of a first frame, either a first type or a second type of a second frame, and a third type of a third frame to an unused memory space of the memory. When the decoding module is outputting the first mode of the video data, all of the first frame, the second frame, and the third frame received by the memory have the same first definition. When the decoding module is outputting the second mode of the video data, both the first frame and the second frame received by the memory have the same first definition, and the third frame has the second definition, wherein the memory size for storing the first definition is greater than the memory size for storing the second definition. When the decoding module is outputting the third mode of the video data, the second frame received by the memory has the first definition, and both the first frame and the third frame have the same second definition. When the decoding module is outputting the fourth mode of the video data, all of the first frame, the second frame, and the third frame received by the memory have the same second definition.

In accordance with an embodiment of the present invention, the first type of frame is I frame, the second type of frame is P frame, and the third type of frame is B frame.

In accordance with an embodiment of the present invention, the first definition is satisfied with the ATSC specification, and the second definition is satisfied with the NTSC specification.

In summary, the memory managing method provided by the present invention replaces a first frame having a first definition with a first frame having a second definition, such that the unused memory space of the memory is increased. In the video data decoding method provided by the present invention, the video frame with higher definition is decoded in a limited memory size. In addition, the video data decoding method outputs frame with different quality according to the different memory sizes.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DESCRIPTION OF THE EMBODIMENTS

First Embodiment

Figure 1:
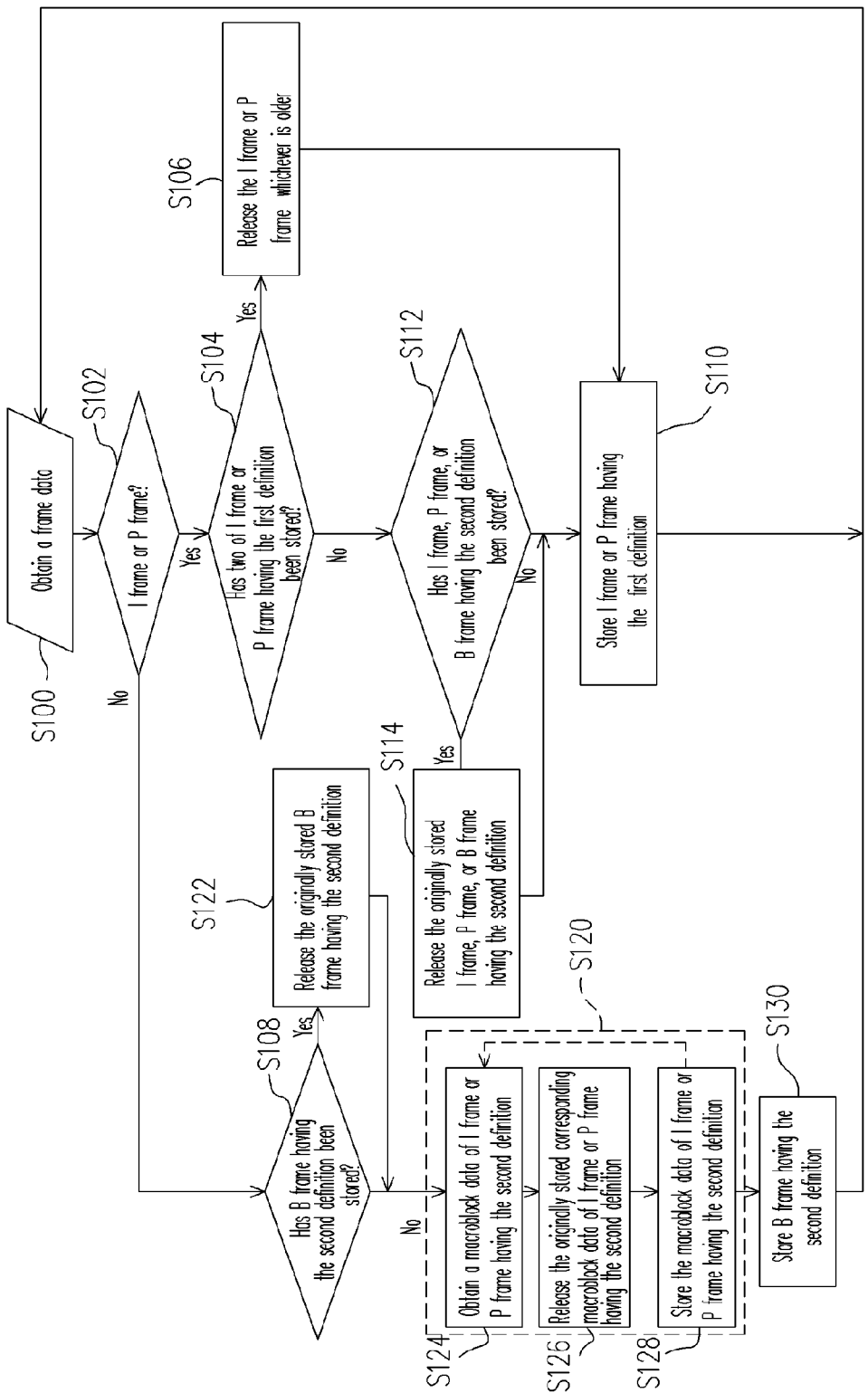
FIG. 1 is a flow chart illustrating a memory managing method according to a first embodiment of the present invention.

FIG. 1 is a flow chart illustrating a memory managing method according to a first embodiment of the present invention. FIGS. 2A~2D schematically show a memory space according to the first embodiment of the present invention. Referring to FIG. 1, the memory managing method of the first embodiment comprises the following steps.

In step S100, a frame is obtained from a decoding module (not shown). In addition, the frame obtained in step S100 may be a first type, a second type, or a third type of frame. Wherein, the first type of frame is I frame, the second type of frame is P frame, and the third type of frame is B frame, for example. In addition, the frame obtained in step S100 may have either a first definition or a second definition, wherein the memory size for storing the first definition is greater than the memory size for storing the second definition. In addition, the first definition may be satisfied with the ATSC specification or other video specification, and the second definition may be satisfied with the NTSC specification or other video specification.

Figure 2A:
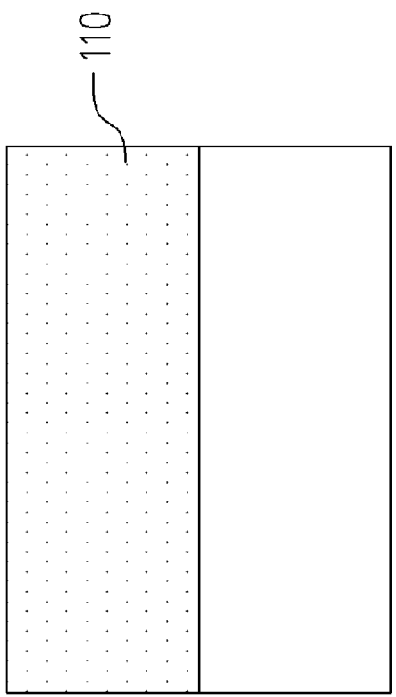
FIGS. 2A~2D schematically show a memory space according to the first embodiment of the present invention.

Referring to FIGS. 1 and 2A, first in step S100, a first frame 110 having a first definition is obtained. Then, in step S102, it is determined whether the obtained first frame 110 is I frame or P frame. If the obtained first frame 110 is either I frame or P frame, step S104 is performed to determine whether any type of two first frames had been stored in the memory or not. If any type of two first frames had been stored in the memory, step S106 is performed to release an older first frame among any type of these two first frames. Then, step S110 is performed to store the first frame 110 having the first definition in an unused memory space of the memory.

If any type of two first frames had not been stored in the memory, step S112 is performed to determine whether any type of frame having the second definition had been stored in the memory or not. If any type of frame having the second definition had been stored in the memory, step S114 is performed to release the memory space where any type of frame having the second definition was originally stored. Then, step S110 is performed to store the first frame 110 having the first definition to the unused memory space of the memory. If any type of frame having the second definition had not been stored in the memory, step S110 is performed to store the first frame 110 having the first definition in the unused memory space of the memory as shown in FIG. 2A.

Figure 2B:
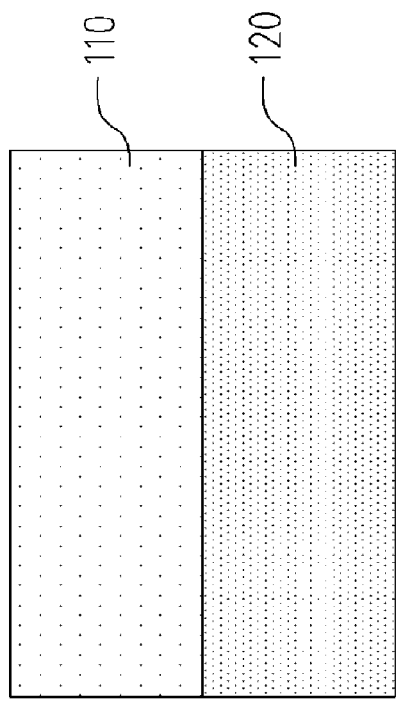

Referring to FIGS. 1 and 2B, after the first frame 110 having the first definition is stored in the memory, step S100 is performed again to obtain a second frame 120 having the first definition. Since only the first frame 110 having the first definition is stored in the memory now, step S110 is directly performed. Meanwhile, the first frame 110 having the first definition and the second frame 120 having the first definition had been stored in the memory (as shown in FIG. 2B). In particular, if the second frame 120 is P frame, the second frame 120 is decoded with reference to the first frame 110. If the second frame 120 is I frame, the second frame is directly decoded without having to refer to any frame. It should be noted that the memory size used in the present embodiment is equal to two times of the frame size having the first definition. However, the memory size may be greater than two times of the frame size having the first definition.

Figure 2C:
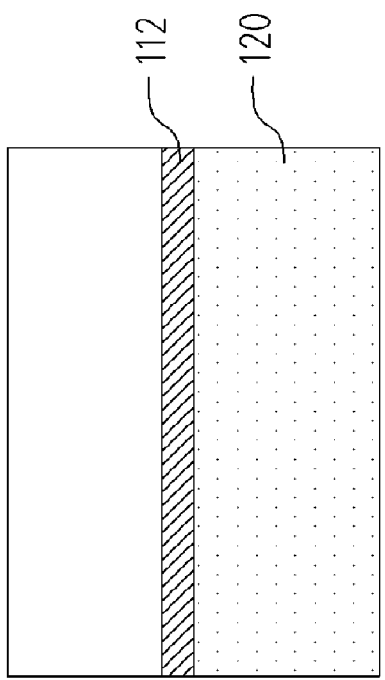

Please refer to FIGS. 1 and 2C. Step S100 is performed. If the B frame having the second definition is to be decoded, step S108 is performed to determine whether B frame having the second definition had been stored in the memory or not. If B frame having the second definition had been stored in the memory, step S122 is performed to release the memory space where B frame having the second definition was originally stored, and then step S120 is performed. If B frame having the second definition had not been stored in the memory yet, step S120 is directly performed to store the first frame having the second definition to the memory space where the first frame having the first definition was originally stored, and to release the remaining memory space left after the original first frame having the first definition was stored.

In particular, step S120 comprises steps S124, S126, and S128. First, step S124 is performed to obtain a macroblock data of the first frame 112 having the second definition. Then, step S126 is performed to release the memory space where the corresponding macroblock data of the first frame 110 having the first definition was originally stored. Then, step S128 is performed to store the macroblock data of the first frame 112 having the second definition in the unused memory space of the memory. It should be noted that steps S124, S126, and S128 are repeated (as shown in the dotted line) until the first frame 110 having the first definition is changed to the first frame 112 having the second definition (as shown in FIG. 2C).

As described above, since the first frame 110 having the first definition had been replaced with the first frame 112 having the second definition, more unused memory space in the memory is emptied, such that B frame having the second definition decoded later can be stored in the memory. It should be noted that the method for changing the first frame 110 having the first definition to the first frame 112 having the second definition comprises either compressing or shrinking it. For example, when the first definition is satisfied with the ATSC specification and the second definition is satisfied with the NTSC specification, the size of the first frame 110 having the first definition is six times of the size of the first frame 112 having the second definition.

Figure 2D:
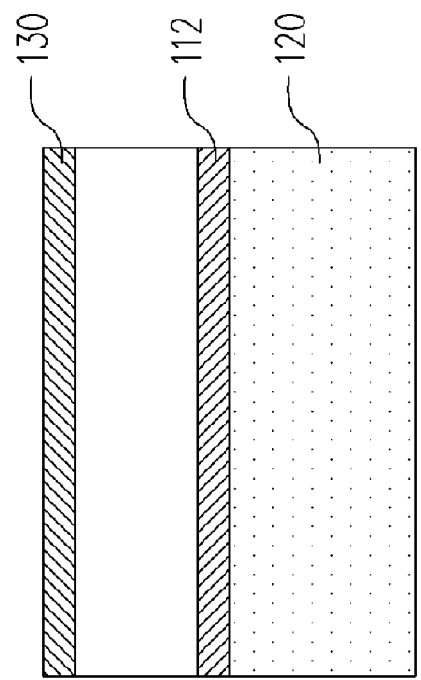

Referring to FIGS. 1 and 2D, B frame having the second definition is decoded with reference to both the first frame 112 having the second definition and the second frame 120 having the first definition in the memory. Then, step S130 is performed to store B frame having the second definition in the unused memory space of the memory. Meanwhile, the first frame 112 having the second definition, the second frame 120 having the first definition, and the third frame 130 having the second definition had been stored in the memory. It should be noted that a step of arranging the unused memory space of the memory may be further added into any of the steps mentioned above.

Referring to FIG. 1, after the steps mentioned above are performed, the second frame 120 (either I frame or P frame) having the first definition, the first frame 112 (either I frame or P frame) having the second definition, and the third frame 130 (B frame) having the second definition had been stored in the memory. It should be noted that before storing the third frame 130 having the second definition to the memory, the first frame 110 having the first definition needs to be changed to the first frame 112 having the second definition, so as to empty the memory space for storing the third frame 130 having the second definition. Compared with the prior art, since the most recently decoded I frame or P frame always has the first definition, the memory managing method provided by the present invention can store frame with higher definition in a limited memory size. In other words, even when the memory size is not changed, the frame with higher definition can be stored by changing the type of the video decoded data.

Second Embodiment

Figure 3:
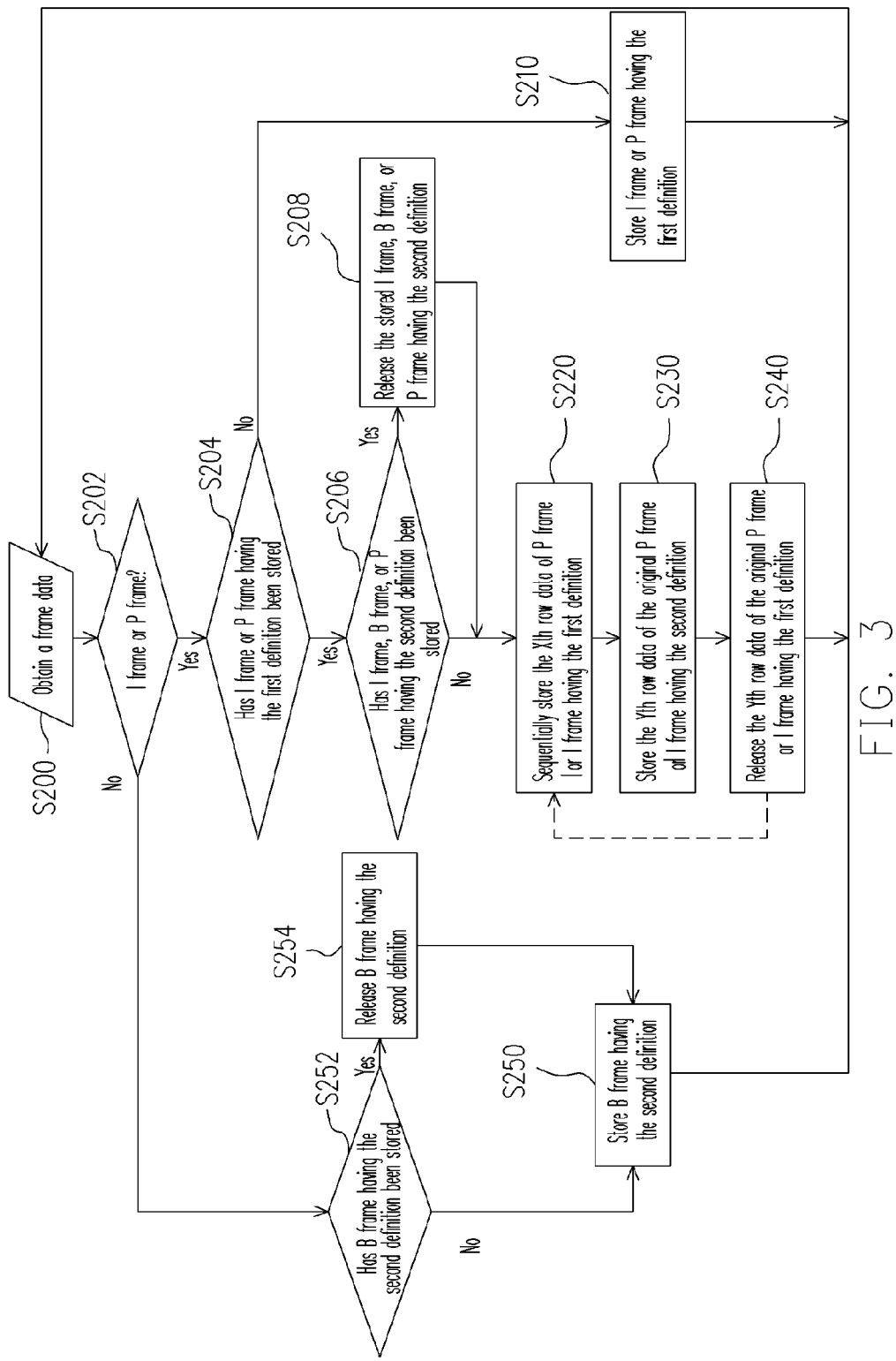
FIG. 3 is a flow chart illustrating a memory managing method according to a second embodiment of the present invention.

FIG. 3 is a flow chart illustrating a memory managing method according to a second embodiment of the present invention. FIGS. 4A~4E schematically show a memory space according to the second embodiment of the present invention. The difference between the second embodiment and the first embodiment mentioned above is that the memory size used in the second embodiment is less than two times of the memory size of the frame having the first definition, and is greater than a sum of one time of the frame having the first definition and one time of the frame having the second definition. The memory managing method of the second embodiment comprises the following steps.

Figure 4A:
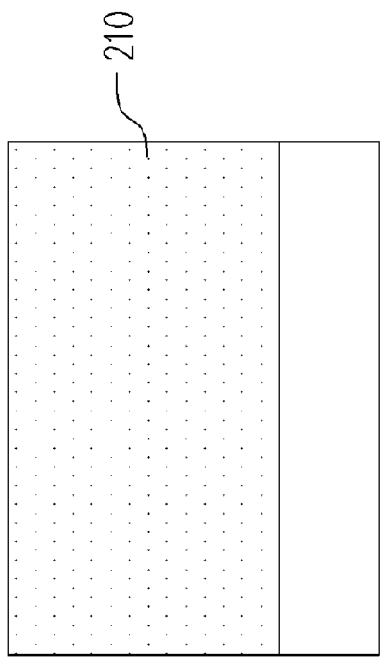
FIGS. 4A~4E schematically show a memory space according to the second embodiment of the present invention.

Please refer to FIGS. 3 and 4A. Steps S200 and S202 are performed, wherein steps S200 and S202 are similar to steps S100 and S102, respectively. Then, if the obtained frame is either I frame or P frame, step S204 is performed to determine whether I frame or P frame of the first frame had been stored in the memory or not. If not, step S210 is performed to store the first frame 210 having the first definition in the unused memory space of the memory. If I frame or P frame of the first frame had been stored in the memory, step S206 is performed to determine whether any type of frame having the second definition had been stored in the memory or not.

If any type of frame having the second definition had been stored in the memory, step S208 is performed to release the memory space where any type of frame having the second definition was originally stored, and then step S220 is performed.

Figure 4B:
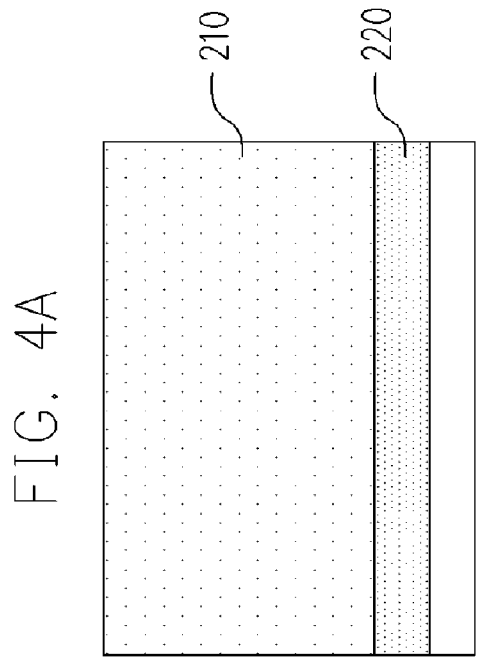

Referring to FIGS. 3 and 4B, if any type of frame having the second definition has not been stored in the memory yet, step S220 is directly performed to sequentially store the Xth row data of the I frame or P frame having the first definition in the unused memory space of the memory. Meanwhile, the Xth row data of the second frame 220 having the first definition had been stored in the memory. It should be noted that if the second frame 220 having the first definition is P frame, the Xth row data of the second frame 220 having the first definition is decoded with reference to the first frame 210 having the first definition. Similarly, if the second frame 220 having the first definition is I frame, the second frame 220 is decoded without having to refer to any frame.

Figure 4C:
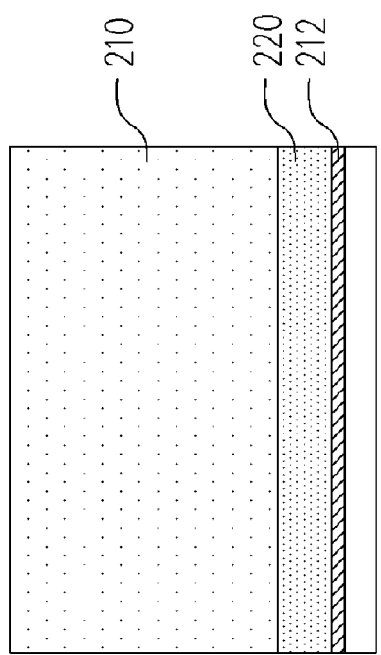

Referring to FIGS. 3 and 4C, step S230 is performed to change the Yth row data of the first frame 210 having the first definition to the Yth row data of the first frame 212 having the second definition, and to store the Yth row data of the first frame 212 having the second definition in the unused memory space of the memory.

Figure 4D:
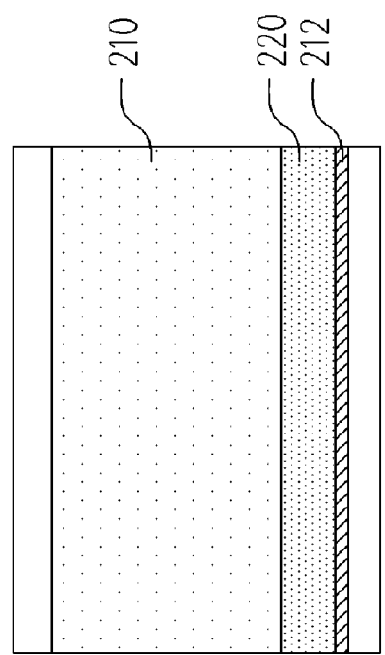

Referring to FIGS. 3 and 4D, then step S240 is performed to sequentially release the memory space where the Yth row data of the I frame having the first definition was originally stored, wherein (X−Y) is greater than or equal to a predetermined tolerance value. Meanwhile, part of the first frame 210 having the first definition, part of the first frame 212 having the second definition, and part of the second frame 220 having the first definition had been stored in the memory. It should be noted that the second frame 220 having the first definition is decoded with reference to the first frame 210 having the first definition. In other words, it is possible that the first frame 210 having the first definition cannot be changed to the first frame 212 having the second definition, thus the predetermined tolerance value mentioned above may be a vertical component of a motion vector. For example, the vertical component of the motion vector is satisfied with the MPEG-2 specification, and the vertical component of the motion vector is, for example, equal to [−128, +127.5]. Then, steps S220, S230, and S240 are repeated until the whole second frame 220 having the first definition is stored in the memory, and the first frame 210 having the first definition is totally replaced with the first frame 212 having the second definition.

Figure 4E:
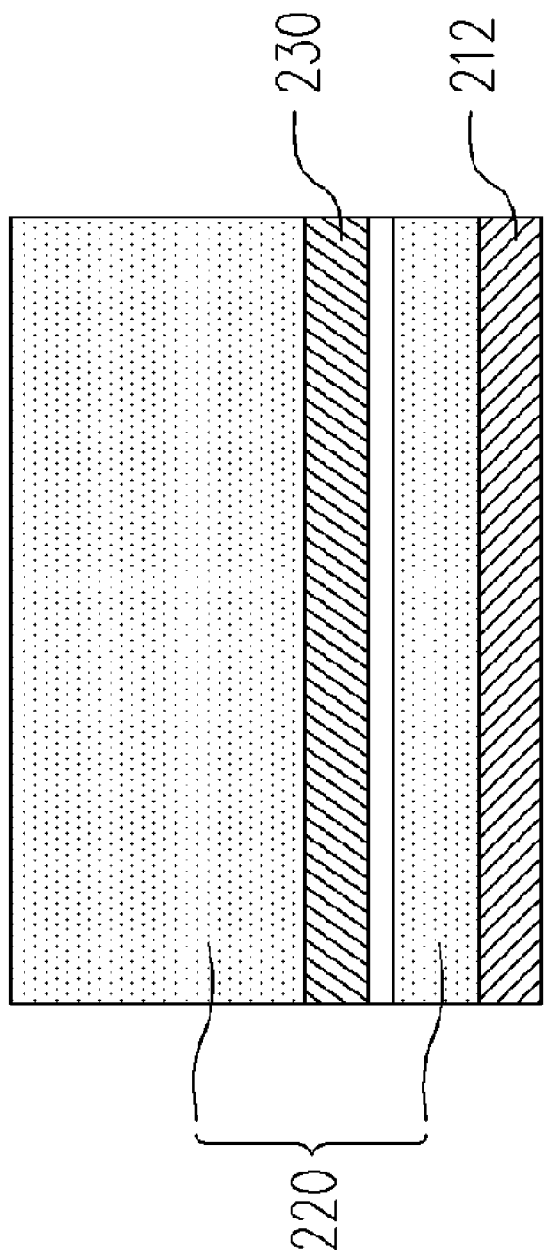

Referring to FIGS. 3 and 4E, B frame having the second definition is decoded with reference to the first frame 212 having the second definition and the second frame 220 having the first definition. Then, step S252 is performed to determine whether the B frame having the second definition had been stored in the memory or not. If the B frame having the second definition had been stored in the memory, step S254 is performed to release the memory space where the B frame having the second definition was originally stored. Then, step S250 is performed to store a third frame 230 having the second definition in the unused memory space of the memory.

If the B frame having the second definition has not been stored in the memory, step S250 is performed to store the third frame 230 having the second definition in the unused memory space of the memory. It should be noted that a step of arranging the unused memory space of the memory may be further added into any of the steps mentioned above.

Referring to FIGS. 3 and 4E, after the steps S210, S220, S230, S240, and S250 mentioned above are performed, the second frame 220 (either I frame or P frame) having the first definition, the first frame 212 (either I frame or P frame) having the second definition, and the third frame 230 (B frame) having the second definition had been stored in the memory. Compared with the prior art, the memory managing method provided by the present invention can store frame with higher definition in a limited memory size.

Figure 5:
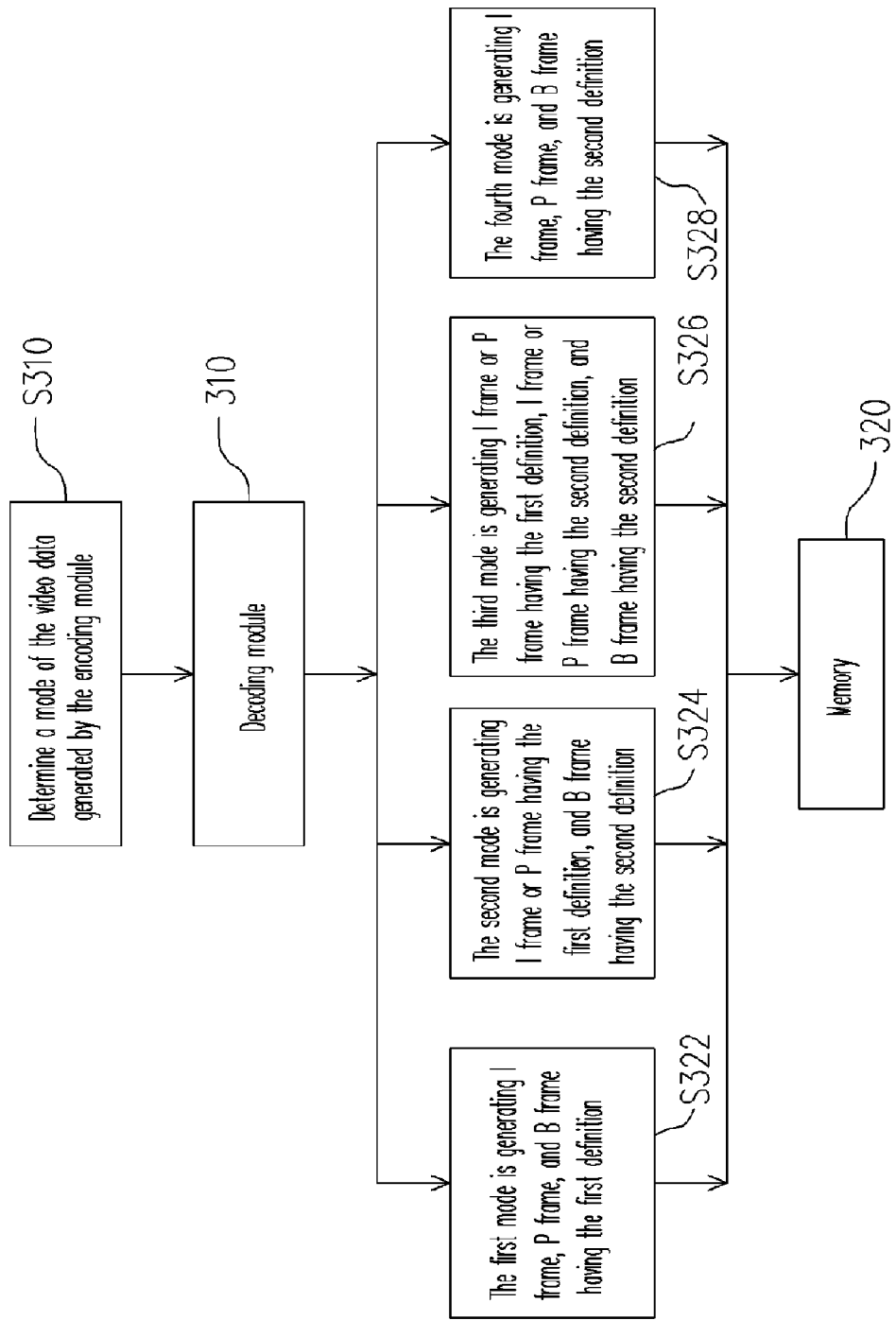
FIG. 5 schematically shows a video data decoding method according to a embodiment of the present invention.

FIG. 5 schematically shows a flow chart illustrating a video data decoding method according to an embodiment of the present invention. The video data decoding method comprises the following steps. First, a decoding module 310 and a memory 320 are provided, wherein the decoding module 310 provides a first type or a second type of a first frame, a second type of a second frame, and a third type of a third frame to an unused memory space of a memory. Then, step S310 is performed to determine a mode of the video data provided by the decoding module 310. In addition, the first type of frame is I frame, the second type of frame is P frame, and the third type of frame is B frame.

Then, step S322 is performed, wherein when a first mode of the video data is output, all of the first frame, the second frame, and the third frame received by the memory 320 have the same first definition. In addition, the first definition is satisfied with the ATSC specification or other video specification. In other words, it is not necessary to change the size or specification of the frame generated by the decoding module 310. Meanwhile, the first mode of the video data provides the best quality but requires maximum memory size to store it.

Then, step S324 is performed, wherein when a second mode of the video data is output, both the first frame and the second frame received by the memory 320 have the same first definition, and the third frame has a second definition, wherein the memory size for storing the first definition is greater than the memory size for storing the second definition. In addition, the second definition is satisfied with the NTSC specification or other video specification. In particular, the decoding module 310 generates the third frame having the first definition originally, however the definition of the third frame is changed from the original first definition to the second definition before the third frame is provided to the memory 320. In addition, the method for changing the first definition to the second definition comprises either compressing or shrinking it. Meanwhile, the second mode of the video data provides second best quality and requires second maximum memory size to store it.

Then, step S326 is performed, wherein when a third mode of the video data is output, the second frame stored in the memory 320 has the first definition, and both the first frame and the third frame have the same second definition. Such operating mode has been described in the first embodiment and the second embodiment mentioned above. Meanwhile, the third mode of the video data provides quality just inferior to the one of the second mode, and requires memory size smaller than the one used in the second mode to store it.

Then, step S328 is performed, wherein when a fourth mode of the video data is output, all of the first frame, the second frame, and the third frame stored in the memory 320 have the same second definition. In particular, the frame generated by the decoding module 310 needs to be changed to the frame having the second definition before it is provided to the memory 320. Meanwhile, the fourth mode of the video data provides worst quality and requires minimum memory size to store it.

In summary, the memory managing method and the video data decoding method provided by the present invention have at least the following advantages.

1. Compared with the prior art, the memory managing method provided by the present invention can store frame with higher definition in a limited memory size.

2. Compared with the prior art, the memory managing method provided by the present invention can store the frame which is satisfied with the ATSC specification without having to increase the memory size.

3. Compared with the prior art, the video data decoding method provided by the present invention can generate four different modes of frame, according to different memory sizes.

Although the invention has been described with reference to a particular embodiment thereof, it will be apparent to one of the ordinary skill in the art that modifications to the described embodiment may be made without departing from the spirit of the invention. Accordingly, the scope of the invention will be defined by the attached claims not by the above detailed description.

What is claimed is:

1. A memory managing method for a video decoding process, comprising:
   A. storing a first frame having a first definition in an unused memory space of a memory, wherein the first frame is either a first type or a second type;
   B. sequentially storing the $X^{th}$ row data of a second frame having the first definition in the unused memory space of the memory, wherein the second frame is either the first type or the second type;
   C. storing the $Y^{th}$ row data of the first frame having a second definition in the unused memory space of the memory, wherein the memory size for storing the first definition is greater than the memory size for storing the second definition;
   D. sequentially releasing the memory space where the $Y^{th}$ row data of the first frame having the first definition was originally stored, wherein (X−Y) is greater than a predetermined tolerance value; and
   E. storing a third frame having the second definition in the unused memory space of the memory, wherein the third frame is a third type.

2. The memory managing method of claim 1, wherein the predetermined tolerance value is a vertical component of a motion vector.

3. The memory managing method of claim 2, wherein the vertical component of the motion vector is satisfied with a MPEG-2 specification.

4. The memory managing method of claim 1, further comprising:

when obtaining the second frame, before the step B, if any type of the frame having the second definition had been stored in the memory, releasing the memory space where any type of frame having the second definition was originally stored.

5. The memory managing method of claim 1, further comprising:

when obtaining the third frame, before the step E, if the third type of the frame having the second definition had been stored in the memory, releasing the memory space where the frame was originally stored.

6. The memory managing method of claim 1, further comprising:

arranging the unused memory space of the memory.

7. The memory managing method of claim 1, wherein the first type of the frame is I frame, the second type of the frame is P frame, and the third type of the frame is B frame.

8. The memory managing method of claim 1, wherein the first definition is satisfied with the ATSC specification, and the second definition is satisfied with the NTSC specification.

9. The memory managing method of claim 1, wherein the memory size is less than two times of the frame size having the first definition, and is greater than a sum of one time of the frame size having the first definition and one time of the frame size having the second definition.

10. A video data decoding method, comprising:

providing a memory;

A. decoding a first frame having a first definition, wherein the first frame is either a first type or a second type, and storing the first frame having the first definition in an unused memory space of the memory;

B. decoding the video data with reference to the first frame having the first definition so as to sequentially obtain the $X^{th}$ row data of a second frame having the first definition, wherein the second frame is the second type, and sequentially storing the $X^{th}$ row data of the second frame having the first definition in the unused memory space of the memory;

C. sequentially changing the $Y^{th}$ row data of the first frame having the first definition to the $Y^{th}$ row data of the first frame having a second definition, and sequentially storing the $Y^{th}$ row data of the first frame having the second definition in the unused memory space of the memory;

D. sequentially releasing the memory space where the $Y^{th}$ row data of the first frame having the first definition was originally stored, wherein (X−Y) is greater than or equal to a predetermined tolerance value; and E. decoding the video data with reference to both the first frame having the second definition and the second frame having the first definition so as to obtain a third frame having the second definition, wherein the third frame is a third type, and storing the third frame having the second definition in the unused memory space of the memory.

11. The video data decoding method of claim 10, wherein the predetermined tolerance value is a vertical component of a motion vector.

12. The video data decoding method of claim 11, wherein the vertical component of the motion vector is satisfied with the MPEG-2 specification.

13. The video data decoding method of claim 10, wherein the step of changing the $Y^{th}$ row data of the first frame the first definition to the $Y^{th}$ row data of the first frame having the second definition comprises either compressing or shrinking it.

14. The video data decoding method of claim 10, wherein the first type of the frame is I frame, the second type of the frame is P frame, and the third type of the frame is B frame.

15. The video data decoding method of claim 10, wherein the first definition is satisfied with the ATSC specification, and the second definition is satisfied with the NTSC specification.

16. The video data decoding method of claim 10, wherein the memory size is less than two times of the frame size having the first definition, and is greater than a sum of one time of the frame size having the first definition and one time of the frame size having the second definition.

17. A video data decoding method, comprising:

providing a decoding module and a memory, wherein the decoding module is suitable for generating one of a first mode, a second mode, a third mode, and a fourth mode of a video data, and the decoding module outputs either a first type or a second type of a first frame, either the first type or the second type of a second frame, and a third type of a third frame to an unused memory space of the memory;

wherein, when the decoding module is providing the first mode of the video data, all of the first frame, the second frame, and the third frame received by the memory have a first definition;

wherein, when the decoding module is providing the second mode of the video data, both the first frame and the second frame received by the memory have the first definition, and the third frame has a second definition, wherein the memory size for storing the first definition is greater than the memory size for storing the second definition;

wherein, when the decoding module is providing the third mode of the video data, the second frame received by the memory has the first definition, and both the first frame and the third frame have the second definition; and wherein, when the decoding module is providing the fourth mode of the video data, all of the first frame, the second frame, and the third frame received by the memory have the second definition.

18. The video data decoding of claim 17, wherein the first type of the frame, is I frame, the second type of the frame is P frame, and the third type of the frame is B frame.

19. The video data decoding of claim 17, wherein the first definition is satisfied with the ATSC specification, and the second definition is satisfied with the NTSC specification.

* * * * *